(12) United States Patent
Vivaudou

(10) Patent No.: US 6,169,128 B1
(45) Date of Patent: Jan. 2, 2001

(54) PLASTIC/RUBBER COMPOSITION

(75) Inventor: Jean Vivaudou, Branford, CT (US)

(73) Assignee: Poly-Typlax Technology Div. of R.W. Technology, Inc., New Haven, CT (US)

( * ) Notice: Under 35 U.S.C. 154(b), the term of this patent shall be extended for 0 days.

(21) Appl. No.: 09/333,374

(22) Filed: Jun. 15, 1999

Related U.S. Application Data

(60) Provisional application No. 60/089,466, filed on Jun. 16, 1998.

(51) Int. Cl.[7] .................................................. C08K 11/00

(52) U.S. Cl. .............................. 523/129; 524/80; 524/525

(58) Field of Search ............................... 521/40; 523/129; 524/80, 525

(56) References Cited

U.S. PATENT DOCUMENTS 5,010,122 * 4/1991 Koski ..................................... 524/80

* cited by examiner

Primary Examiner—Nathan M. Nutter
(74) Attorney, Agent, or Firm—Melvin I. Stoltz

(57) ABSTRACT

By employing the present invention, a process for manufacturing products from discarded rubber and plastic material is achieved wherein compositions of vulcanized rubber and thermoplastic polymers, particularly those of the olefinic branch, are intermixed with a bonding agent to produce a processable compound having a combination of unique and unexpected properties. In the present invention, a unique bonding agent comprising a combination of ethylene co-polymers, ethylene-octane and acrylic acid is employed. By employing this bonding agent with the rubber particular and thermoplastic material, all of the prior art drawbacks are eliminated and a unique, desirable, highly useful composition is produced.

6 Claims, No Drawings

PLASTIC/RUBBER COMPOSITION

CONTINUTING DATA

This application claims priority from Provisional Application No. 60/089,466 filed Jun. 16, 1998.

TECHNICAL FIELD

This invention relates to a process for manufacturing products from discarded rubber and plastic materials.

BACKGROUND ART

One environmental problem that has existed for decades, and continues to exist without a viable resolution, is the inability to discard rubber tires in a manner which is not environmentally detrimental. Due to the volume of discarded tires, landfills often refuse to accept these products and consumers and the tire industry have developed no viable solution for resolving this difficulty.

It is presently estimated that over two billion discarded tires exist in the United States with about 300,000,000 tires being discarded annually. Presently, any viable use for discarded tires raises serious environmental issues or has such a limited commercial feasibility that no significant impact on the problem is realized.

Various attempts have been proposed for re-claiming vulcanized rubber over the last several decades. However, these proposals typically attempt to de-vulcanize the rubber in order to obtain a processable rubber. However, this technology typically requires the taking of particular vulcanized rubber and removing fibers therefrom. Then, the resulting product is treated with combinations of chemicals, steam heat and/or considerable mechanical working to reduce molecular weight and thereby enable the resultant material to be processed and re-vulcanized as a conventional rubber product. The reclaimed rubber produced by this process is typically blended with virgin rubber or used directly, depending on the particular techniques used and the end product to be made.

The use of particular vulcanized rubber as an ingredient in thermoplastic compounds is very limited. Although several proposals have been made, these prior art proposals typically suffer from the primary disadvantage that the process is extremely costly due to the de-vulcanization expenses and the limited utility of the resulting product.

In spite of these prior art efforts, a need continues to exist for a processable composition of vulcanized rubber and thermoplastic materials which exhibit excellent overall toughness, strength, and wearability and flexibility. Furthermore, a need exists for a plastic/rubber composition which can be processed in a relatively simple and economical manner without requiring de-vulcanization the particulate rubber.

One prior art teaching in this field is found in U.S. Pat. No. 5,010,122 wherein a process is taught for combining rubber particulate and thermoplastic material with a coupling agent to achieve a final usable resulting composition. However, the composition and process taught in this prior art patent has achieved only limited success, since the process has been difficult and costly to carry out.

Therefore, it is a principal object of the present invention to provide a plastic/rubber composition having utility in producing high quality non-rubber thermoplastic products as well as crossed linked products and rubber products.

Another object of the present invention is to provide plastic/rubber compositions having the characteristic features described above which incorporate excellent physical properties.

Another object to the present invention is to provide plastic/rubber compositions having the characteristic features described above which is capable of being produced in a relatively simple and economical process.

Other and more specific objects will in part be obvious it will in part appear hereinafter.

SUMMARY OF THE INVENTION

By employing the present invention, all of the difficulties and drawbacks found in the prior art are eliminated and an easily employed process is achieved which is capable of producing products which are highly flexible, possess greater elasticity, wearability, and longevity. In addition, the processing drawbacks encountered by employing the teaching of U.S. Pat. No. 5,010,122 are completely overcome and totally eliminated by the present invention.

In accordance with the present invention, compositions of vulcanized rubber and thermoplastic polymers, particularly those of the olefinic branch, are intermixed with a bonding agent to produce a processable compound having a combination of unique and unexpected properties. Such products manufactured from these compounds have been found to exhibit excellent processability, overall toughness, strength, flexibility, wearability, and elasticity. It is believed that the ingredients act synergistically to impart a resulting compound with superior strength, as compared to the base thermoplastic material, while also possessing the wide variety of the other attributes detailed above.

In accordance with the present invention, the desired composition is realized by combining rubber particulate, thermoplastic material, and a bonding agent as detailed herein. Preferably, the bonding agent comprises between about 1% and 12% by weight of the weight of the rubber particulate and thermoplastic material. In addition, the rubber particulate and the thermoplastic material are present in a weight ratio ranging between about 1:9 and 9:1.

The rubber particulate preferably comprises one or more selected from the group consisting of natural rubber, synthetic polymers and copolymers of rubber and blends thereof. The thermoplastic material preferably comprises one or more selected from the group consisting of olefins, copolymers of olefins, homopolymers of olefins and blends thereof. In particular, such thermoplastic materials may be selected from the group consisting of polyethylene, polypropylene, ionomers, polybutylene, and ethylene vinyl acetate.

In the present invention, a unique bonding agent is employed to attain the desired final composition using a process which is easily achieved. This unique bonding agent comprises a combination of ethylene co-polymers, ethylene-octane and acrylic acid. By employing this bonding agent with the rubber particular and thermoplastic material in a quantity ranging between about 1% and 12% by weight of the weight of the rubber particulate and thermoplastic material, all of the prior art drawbacks are eliminated and a unique, desirable, highly useful composition is produced.

In the preferred process for attaining the desired resulting composition of the present invention, vulcanized rubber is first ground into small particles or particulates. The rubber particulate is then mixed with the thermoplastic material in a mixer at a sheer rate less than that which causes de-vulcanization of the rubber and at a relatively low pressure to reduce the creation of a thermal history. Preferably, mixing is carried out at a temperature near the mid-point of the base polymer's established melt range.

During the mixing of these two ingredients, the bonding agent is blended into the mixture. The resulting composition is then processed in any desired manner for achieving the final product for which the composition is to be employed. Examples of various processing steps include pelletizing the composition by feeding it through a die face and then packaging the resulting pelletized product for shipment to processors. Alternatively, the mixture can feed the thermoplastic composition directly into final processing equipment, such as sheet extruders, profile extruders, injection molding machines, and the like.

DETAILED DESCRIPTION

As detailed above, the present invention is directed to the re-cycling of discarded rubber products and the formation of a resulting composition which has excellent physical properties for enabling the composition to be employed in a variety of alternate applications or products. The discarded rubber products include pneumatic tires, liners, and/or other discarded rubber products or by-products formed from natural rubber, polymers and co-polymers of the synthetic rubber, such as styrene-butadiene rubber, ethylene-propylene diene rubber, etc. and blends thereof. While it is preferred that the rubber be vulcanized, the compositions of the present invention can also be formed using virgin or de-vulcanized rubber. The term vulcanized rubber as used herein is meant to include whenever fillers, additives, and the like, which are found to be bound into the rubber such as carbon black, fibers, oils, and zinc oxide in the case of whole tire crumb.

The rubber products to be used in the present invention are first ground into particles or particulates. Generally, such particulates should have a size which is no greater than 30 mesh. However, it has been found that by employing finer particulate sizes, namely particulates having a size less than 10 mesh, a more desirable cosmetic appearance is produced.

The rubber particulate may be formed using any suitable grinding technique known in the art. Alternatively, commercially available ground waste rubber can be used. Any metal within the waste rubber should be removed, either mechanically or magnetically, prior to processing. Fiber material in the waste rubber such as tire cord fiber up to about 30 percent by weight may be retained, since it does not adversely affect the formulation of the final compositions of the present invention.

After the rubber particular or crumb has been formed, the rubber particular is inter-mixed with the thermoplastic material along with the bonding agent and fed into a continuous mixing device. The thermoplastic material may comprise any suitable thermoplastic material such as olefinic polymers or thermoplastic elastomeric materials. Suitable olefinic polymers include, but are not limited to, polyethylenes of various densities, linear low density polyethylenes, polypropylene, ionomers, polybutylene, ethylene vinyl acetate, and co-polymer or homopolymer versions of these polymers. Also suitable for use are blends of the aforementioned polymers and filled polymer systems that use one or more of these polymers as the base ingredient.

During mixing, the weight ratio of vulcanized rubber to thermoplastic material preferably ranges between about 1:9 and 9:1. In many instances, it has been found that a weight ratio ranging between about 1:3 and 3:1 produces desirable results. In this regard, it has been found that as the rubber component percentage increases so does the flexibility or impact strength of the final product. Consequently, one of the advantages of the present invention is the ability to selectively tailor the stiffness or flexibility of the final composition, as well as its resulting strength, merely by varying the rubber content in the mixture.

In producing the composition of the present invention, mixing of the rubber particulate, thermoplastic material and bonding agent may be achieved using any suitable mixing device known in the art. For example, mixing may be carried out in a ribbon mixer or in a continuous mixer having counter-rotating rotors or screws to blend the material. Devices such as Farrell Continuous Mixers or twin screw extruders may also be used. A Farrell Continuous Mixer or a similar counter-rotating dual rotor high sheer continuous mixer is preferred for its ability to mix at lower energy levels for equal amounts of mixing, thereby creating less thermal history for similar degrees of mixing. Furthermore, it has been found that the use of a continuous mixer enables the greater economies of scale, simplify quality assurance and provides lower cost than methods requiring batch productions, such as a Banbury mixer. In addition it is desirable that the temperature maintained during mixing is near the mid-point of the melt range established for the base polymers.

In employing the present invention, the incorporation of the unique bonding agent defined herein has been found to be of particular importance, since this bonding agent effectively functions as an adhesive for the rubber particulate and thermoplastic material. In order to attain the desired result, the bonding agent is formulated by intermixing ethylene co-polymers, ethylene octane, and acrylic acid. By combining these principal ingredients, a unique bonding agent is realized which is capable of effectively adhering the rubber particulate with the thermoplastic material.

In addition to the principal ingredients detailed above, the bonding agent of the present invention, in its preferred formulation, also incorporates peroxide, silicone, and a UV stabilizer. In this preferred formulation, the bonding agent of the present invention comprises a melt index of 9.0, a density of 0.32, and a tensile strength of 2,500.

Effective bonding agent formulations can be achieved by employing these ingredients in a wide range of percent by weight formulations. As provided below, the preferred formulation ranges for the bonding agent of the present invention is detailed in Table I:

TABLE I

| Component | Percent by Weight Range |
| --- | --- |
| Ethylene co-polymers | 50–90 |
| Ethylene Octane | 2–25 |
| Acrylic acid | 2–20 |
| Peroxide | 1–3 |
| Silicone | 0.2–1 |
| UV Stabilizer | 0.5–2 |

Using the formulations attainable by employing Table I, a highly effective bonding agent is realized for producing the desired composition of the present invention which can then be employed for attaining a wide variety of alternate products. In general, it has been found that the particular formulation of the bonding agent employed depends upon the variety and quality of the rubber particulate and plastic material to be bonded. In this regard, such factors as whether the rubber material comprises waste tires, vulcanized rubber or natural rubber, as well as the variety of polymers employed, impact upon the specific formulation employed for the bonding agent.

Depending upon the ingredients employed, and the weight ranges for these ingredients, a wide variety of alternate physical properties are imparted to the resulting composition. More particularly, it has also been found that a highly effective and desirable composition is attained by employing the bonding agent formulation defined in Table II:

TABLE II

| Component | Percent by Weight |
| --- | --- |
| Ethylene co-polymers | 80 |
| Ethylene octane | 10 |
| Acrylic acid | 6.5 |
| Peroxide | 1.5 |
| Silicone | 0.5 |
| UV Stabilizer | 1.0 |

By employing the bonding the agent of the present invention, a permanent adhesive bond is attained between the rubber particulate and the thermoplastic material. In this way, a highly simplified process is realized, since the resulting desired composition is attained by merely mixing any grade of rubber with a variety of thermoplastic materials and simply adding the bonding agent to the composition for attaining the desired integral bonded interengagement of the ingredients. As is apparent from the foregoing detailed disclosure, the bonding agent of the present invention has an affinity to both the organic and inorganic components in the mixture, thereby making the process simple and efficient. As a result, the problems and drawbacks previously encountered by the process detailed in U.S. Pat. No. 5,010,122 are overcome.

By varying of the quantity of bonding agent employed, physical properties attained by the resulting composition can be specifically dictated. In this regard, it has been found that by incorporating the bonding agent into the composition at a rate ranging between about 2% and 5% by weight of the materials to be bonded, the resulting composition possesses excellent wearability and flexibility. In particular, it has been found that shoe soles can be produced from this composition which have been shown to have excellent flexibility, durability, and wearability.

In order to prove the efficacy of the present invention, tests were conducted wherein the bonding agent was added to a composition of rubber particulate and thermoplastic materials at the rate of 3% by weight of the entire weight of the base ingredients. The resulting product was used to produce a shoe sole which was tested for three months for wear, durability, and flexibility. The test results demonstrated that the composition of the present invention, when compared to the properties of a conventional shoe sole, provided a shoe sole having physical characteristics equal to 95% of the conventional shoe sole.

Additional tests were conducted wherein the bonding agent comprises a quantity ranging between about 7% and 10% by weight of the weight of the rubber particulate and thermoplastic material. The resulting composition demonstrated flexibility, wearability, and elasticity. In addition, the composition also possessed the added properties of resisting heat and cold, ranging between 35° C. and 95° C., as well as being able to be stored for long time periods without deterioration.

It has also been found that by incorporating an anti-oxidant into the bonding agent, the resulting composition maintains a high level of freshness over long periods of storage. In this regard, it has been found that 0.25% by weight of the anti-oxidant is sufficient to attain this desirable result.

In addition, in order to eliminate the unpleasant smell of burnt rubber typically produced by the rubber particulate, it has been found that a deodorant and/or fragrance should be added to the bonding agent. Preferably, aluminum chloral hydrate and/or methyl nonyl acetate alcohol have been found to provide the desired result of eliminating the undesirable burnt rubber odor. Typically, quantities of these compounds ranging between 0.005% and 0.05% by weight are sufficient to produce the desired results.

By incorporating aldehydes having carbon chain lengths ranging between about 10 and 18 into the bonding agent, various fruit odors can be imparted into the resulting composition. In this way, products such as specialized mats can be achieved. Typically, it has been found that aldehyde quantities ranging between about 0.001% and 0.01% by weight produce the desired effect.

It will thus be seen that the objects set forth above, along those made apparent from the preceding description, are efficiently attained and, since certain changes may be made in carrying out the above process and in the composition set forth without departing from the scope of the invention, it is intended that all matter contained in the above description shall be interpreted as illustrative and not in a limiting sense.

It is also to be understood that the following claims are intended to cover all of the generic and specific features of the invention herein described, and all statements of the scope of the invention which, as a matter of language, might be said to fall therebetween.

Having described my invention what I claim as new and desire to secure by Letters Patent is:

1. A process for manufacturing useful products from unwanted rubber, and plastic material comprising the steps of:

A. intermixing a rubber particulate with thermoplastic material with sufficient quantities of each to have a weight ratio ranging between about 1:9 and 9:1;

B. forming a blending agent by combining ethylene copolymers, ethylene-octane and acrylic acid;

C. adding between about 1% and 12% by weight based upon the weight of the entire mixture of the blending agent; and D. processing the resultant composition into the desired final product.

2. The process defined in claim 1, wherein said blending agent is added to the rubber particulate and thermoplastic material during the intermixing step.

3. A process for manufacturing useful products from unwanted rubber and plastic material comprising the steps of:

A. grinding rubber products into particles or particulate material having a size less than 30 mesh;

B. forming a blending agent comprising:

a. between about 50% and 90% by weight based upon the weight of the entire composition of ethylene copolymers, b. between about 2% and 25% by weight based upon the weight of the entire compositions of ethylene octane; and c. between about 2% and 20% by weight based upon the weight of the entire composition of acrylic acid;

C. mixing the rubber particulate material with thermoplastic material in a continuous mixing device with sufficient quantities of each to have a weight ratio ranging between about 1:9 and 9:1;

D. adding between about 1% and 12% by weight based upon the weight of the entire mixture of the bonding agent into the continuous mixing vessel;

E. continuing the mixing process until all ingredients are fully blended together to produce a substantially uniform composition; and F. processing the uniform compositions into the desired final product.

4. The process defined in claim 3, wherein the rubber products comprise discarded rubber products consisting of at least one selected from the group consisting of pneumatic tires, liners, and/or other discarded rubber products or by-products formed from natural rubber, polymers and co-polymers of the synthetic rubber, such as styrene-butadiene rubber, ethylene-propylene diene rubber, and blends thereof.

5. The process defined in claim 4, wherein the thermoplastic material comprises at least one selected from the group consisting of olefinic polymers, thermoplastic elastomeric materials, polyethylenes, linear low density polyethylenes, polypropylene, ionomers, polybutylene, ethylene vinyl acetate, and co-polymer or homopolymer versions of these polymers.

6. The process defined in claim 5, wherein the bonding agent further comprises:

d. between about 1% and 3% by weight based upon the weight of the entire composition of peroxide, e. between about 0.2% and 1% by weight based upon the weight of the entire composition of silicone; and f. between about 0.5% and 2% by weight based upon the weight of the entire composition of at least one UV stablizer.

* * * * *